United States Patent
Welch et al.

(10) Patent No.: US 7,358,958 B2
(45) Date of Patent: Apr. 15, 2008

(54) METHOD FOR LOCATING A LIGHT SOURCE RELATIVE TO OPTICS IN AN OPTICAL MOUSE

(75) Inventors: Paul M. Welch, Cupertino, CA (US); Sai-Mun Lee, Penang (MY); Gurbir Singh A/L Balwant Singh, Penang (MY); Ak-Wing Leong, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 715 days.

(21) Appl. No.: 10/840,068

(22) Filed: May 5, 2004

(65) Prior Publication Data

US 2005/0249449 A1    Nov. 10, 2005

(51) Int. Cl.
*G09G 5/08*    (2006.01)
(52) U.S. Cl. .................. 345/166; 345/163; 345/164; 345/165; 345/167
(58) Field of Classification Search ............... 345/166, 345/163, 164, 165, 167
See application file for complete search history.

(56) References Cited

U.S. PATENT DOCUMENTS 3,741,653 A * 6/1973 Svetlichny ............... 356/141.1
6,421,045 B1   7/2002 Venkat et al.
7,068,257 B1 * 6/2006 Bohn ........................ 345/166
7,131,751 B1 * 11/2006 Theytaz et al. ............. 362/396
2003/0034959 A1   2/2003 Davis et al.

OTHER PUBLICATIONS

Solid-State Optical Mouse Sensor with PS/2 and Quadrature Outputs Application Note 1179 HDNS 2000, HDNS-2100 & HDNS-2200 Oct. 24, 2001.
Solid-State Optical Mouse Lens Agilent HDNS-2100 Data Sheet Apr. 25, 2001.
Agilent ADNS-2620 Optical Mouse Sensor Product Overview Jun. 17, 2003.
Agilent ADNK-2623 Optical Mouse Designer's Kit Product Overview Jul. 3, 2003.
Solid-State Optical Mouse LED Assembly Clip Technical Data HDNS-2200 & HDNS-2200 #001.

* cited by examiner

*Primary Examiner*—Richard Hjerpe
*Assistant Examiner*—Leonid Shapiro

(57) ABSTRACT

An optical tracking assembly for an optical mouse includes a light source, an optical sensor chip, and an integral optics assembly. The integral optics assembly includes lenses and alignment features receiving the light source. The alignment features center the light source to the lenses and control a distance the light source is placed away from a navigation surface that reflects light onto the optical sensor chip. The lenses may include (1) collimating lenses for collimating light from the light source along a first optical axis to the navigation surface, and (2) imaging lenses for imaging reflected light from the navigation surface along a second optical axis to the optical sensor chip.

15 Claims, 7 Drawing Sheets

METHOD FOR LOCATING A LIGHT SOURCE RELATIVE TO OPTICS IN AN OPTICAL MOUSE

DESCRIPTION OF RELATED ART

FIGS. 1, 2, and 3 illustrate exploded, assembled, and cross-sectional views of an optical tracking assembly 10 for a conventional optical mouse. Assembly 10 includes an optical mouse sensor chip 12, a solid-state optical mouse lens 14, a solid-state optical mouse light emitting diode (LED) assembly clip 16, and a LED 18. These components interlock as they are mounted onto defined features in mouse printed circuit board (PCB) 20 and a mouse base plate 22.

Sensor 12 (e.g., Agilent HDNS-2000) contains an integrated circuit (IC) housed in an optical package designed for through-hole mounting on a mouse printed circuit board (PCB) 20. Sensor 12 module mounts face down on PCB 22. An aperture stop is provided via the lid on the package through which surface images are acquired via photocells on the IC. The features on the lid align lens 14 to sensor 12.

Lens 14 (e.g., Agilent HDNS-2100) provides the optical path for assembly 10. Lens 14 includes imaging lens 24 (FIG. 3) through which sensor 12 acquires surface images, integral light pipe 26 (FIG. 3) through which LED 18 provides the surface illumination, and a lensed prism 28 (FIG. 3) to focus the LED light at the optimal angle of incidence. The features on lens 14 align with features on base plate 22 and clip 16. Lens 14 also protects sensor 12 and LED 18 from any electrostatic discharge (ESD) events that occur at the opening in base plate 22.

Clip 16 (e.g., Agilent HDNS-2200) provides a snap-in mechanical housing for LED 18. Clip 16 holds LED 18 and aligns all of the components to base plate 22. Clip 16 interlocks to the top of sensor 12 and light pipe 26 of lens 14. The whole assembly then aligns to features on base plate 22.

SUMMARY

In one embodiment of the invention, an optical tracking assembly for an optical mouse includes a light source, an optical sensor chip, and an integral optics assembly. The integral optics assembly includes lenses and alignment features receiving the light source. The alignment features center the light source to the lenses and control a distance the light source is placed away from a navigation surface that reflects light onto the optical sensor chip. The lenses may include (1) collimating lenses for collimating light from the light source along a first optical axis to the navigation surface, and (2) imaging lenses for imaging reflected light from the navigation surface along a second optical axis to the optical sensor chip.

BRIEF DESCRIPTION OF THE DRAWINGS

Use of the same reference numbers in different figures indicates similar or identical elements.

DETAILED DESCRIPTION

As described above, a conventional optical mouse typically incorporates a sensor, optics, an LED light source, and some means to optically couple the light source with the optics. Several designs have been used for the optical coupling. With the current designs, the LED position and orientation is important, but not critical, to the proper performance of the optical mouse.

With the introduction of the laser as the light source and the use of collimating optics with the laser output beam, the position and orientation of the beam with respect to the optical elements becomes more critical to achieve the proper performance characteristics. Tight-tolerance mechanical positioning of the light source is needed.

Figure 1:
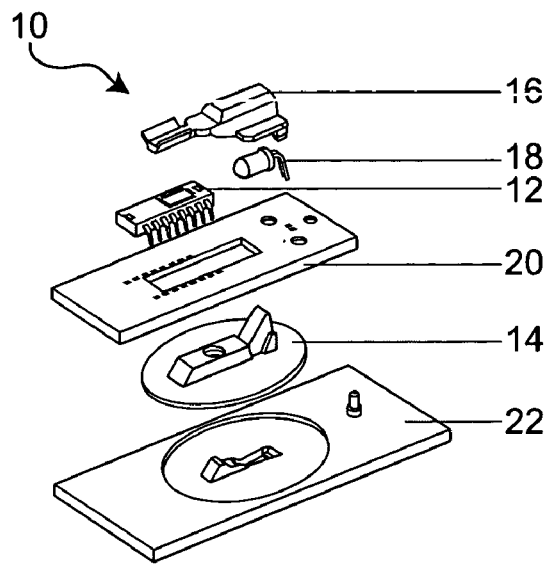
FIGS. 1, 2, and 3 illustrate exploded, assembled, and cross-sectional views of an optical tracking assembly for a conventional optical mouse.
Figure 2:
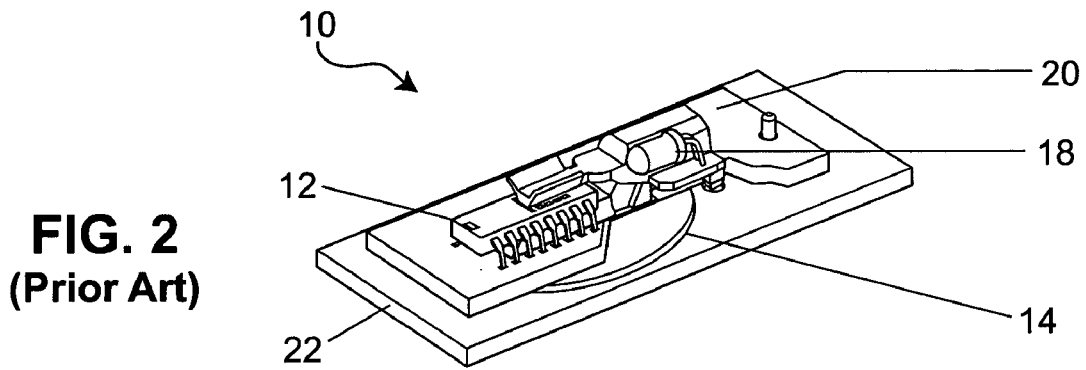
Figure 3:
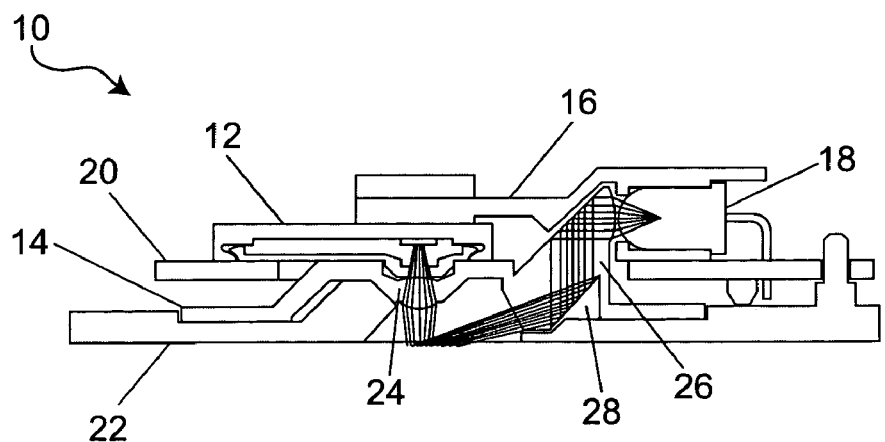
Figure 4:
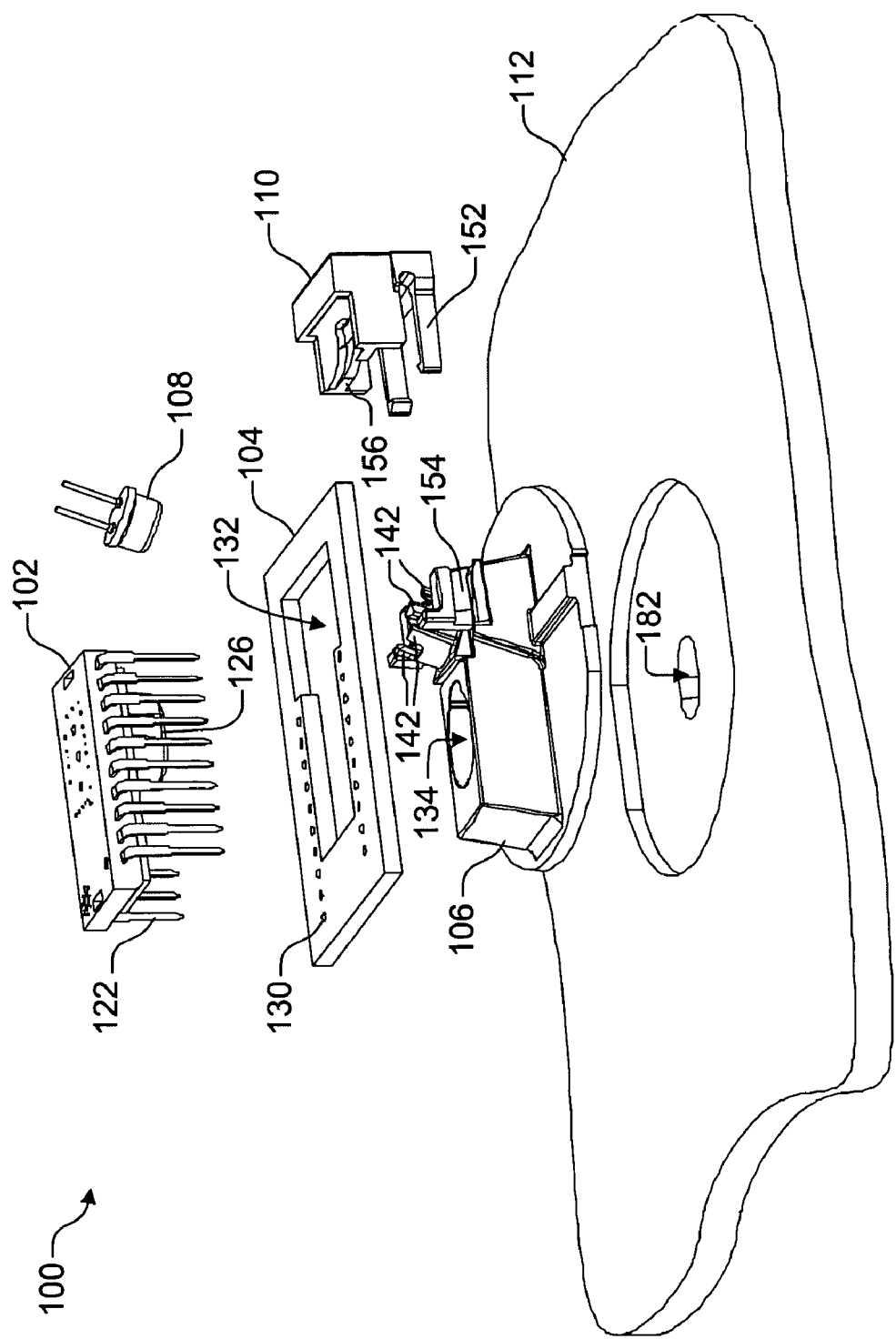
FIG. 4 illustrates an exploded view of an optical tracking assembly in one embodiment of the invention.
Figure 5:
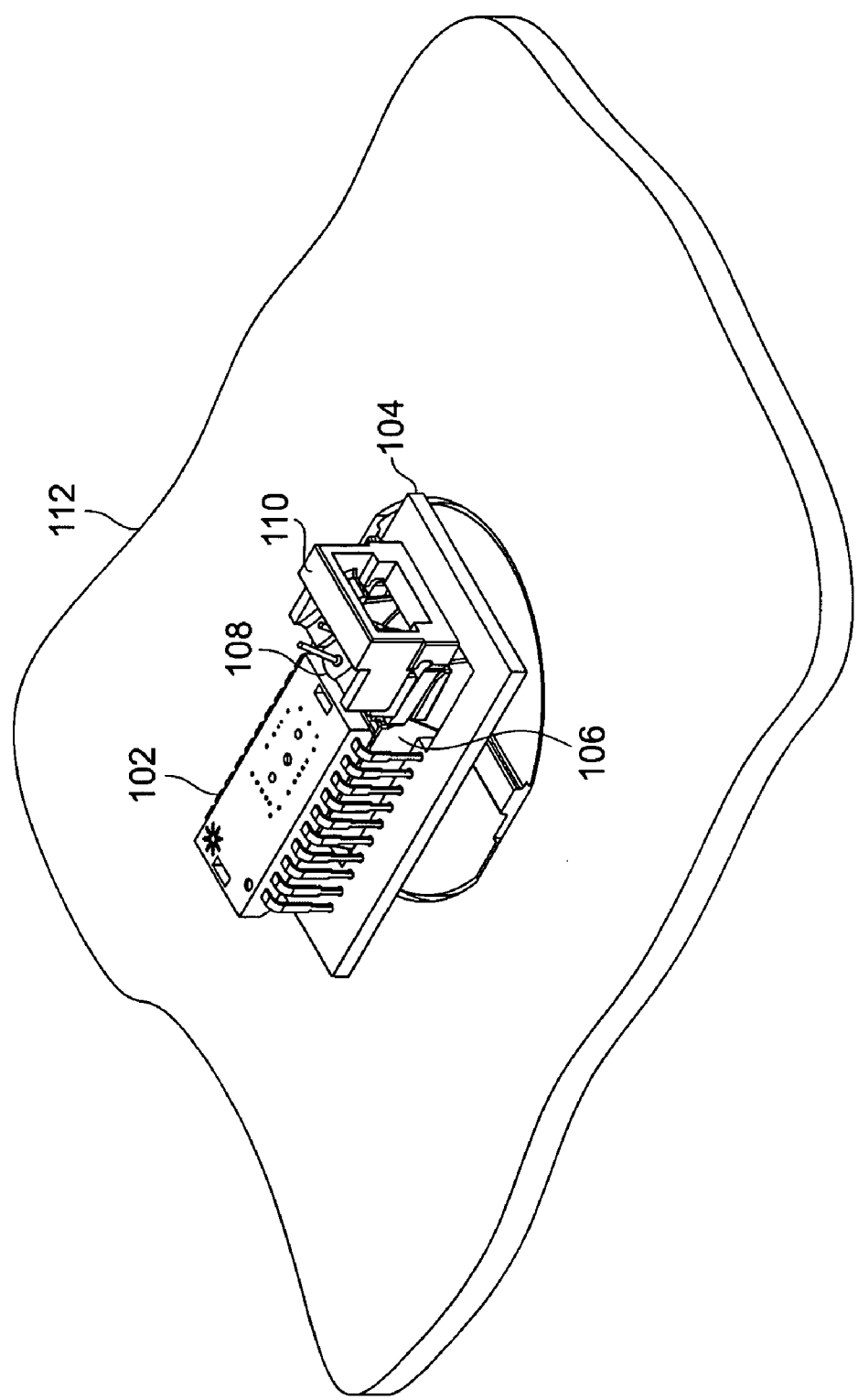
FIG. 5 illustrates an isometric assembled view of the optical tracking assembly of FIG. 4 in one embodiment of the invention.
Figure 6:
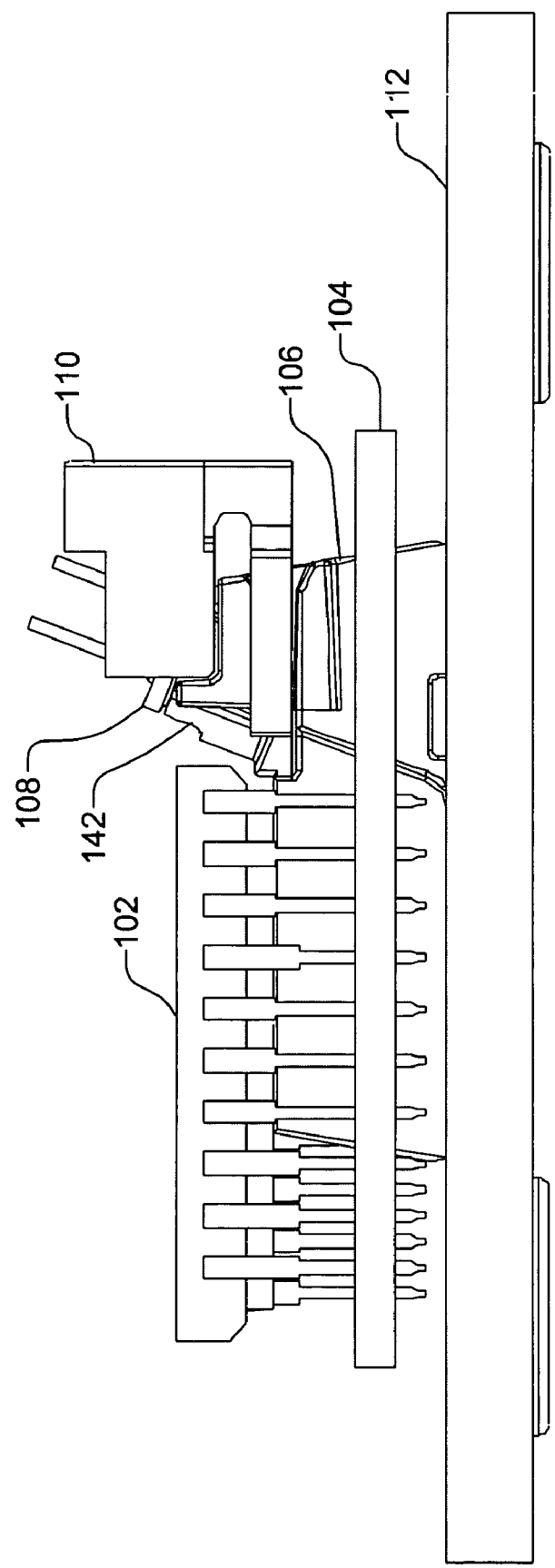
FIG. 6 illustrates a side assembled view of the optical tracking assembly of FIG. 4 in one embodiment of the invention.

FIGS. 4, 5, and 6 illustrate exploded and assembled views of an optical tracking assembly 100 for an optical mouse in one embodiment of the invention. Assembly 100 includes an optical sensor chip 102, a printed circuit board (PCB) 104, an integral optics assembly 106, a laser light source 108, a laser retention clip 110, and a mouse base plate 112.

Optical sensor chip 102 includes pins 122 (only one is labeled in FIG. 4) extending downward from the optical package, a downward facing array of photocells 124 (shown in FIG. 7) within the optical package, and a sensor alignment feature 126 formed on the bottom surface of the package. Alignment feature 126 may be a hollow oblong protrusion having an aperture 128 (FIG. 7) that allows light to be reflected from a navigation surface 129 (shown in FIG. 7) onto photocells 124. Optical sensor chip 102 is mounted on PCB 104 by passing pins 122 through the corresponding mounting holes 130 (only one is labeled in FIG. 4) on PCB 104 and then soldering pins 122 to traces on PCB 104.

PCB 104 defines a cutout 132 (shown in FIG. 4) that conforms to the outline of integral optics assembly 106. Optics assembly 106 is inserted into cutout 132 until the sides of optics assembly 106 are flush against cutout 132. At the same time, sensor alignment feature 126 is inserted into a sensor alignment hole 134 defined by optics assembly 106.

Figure 8:
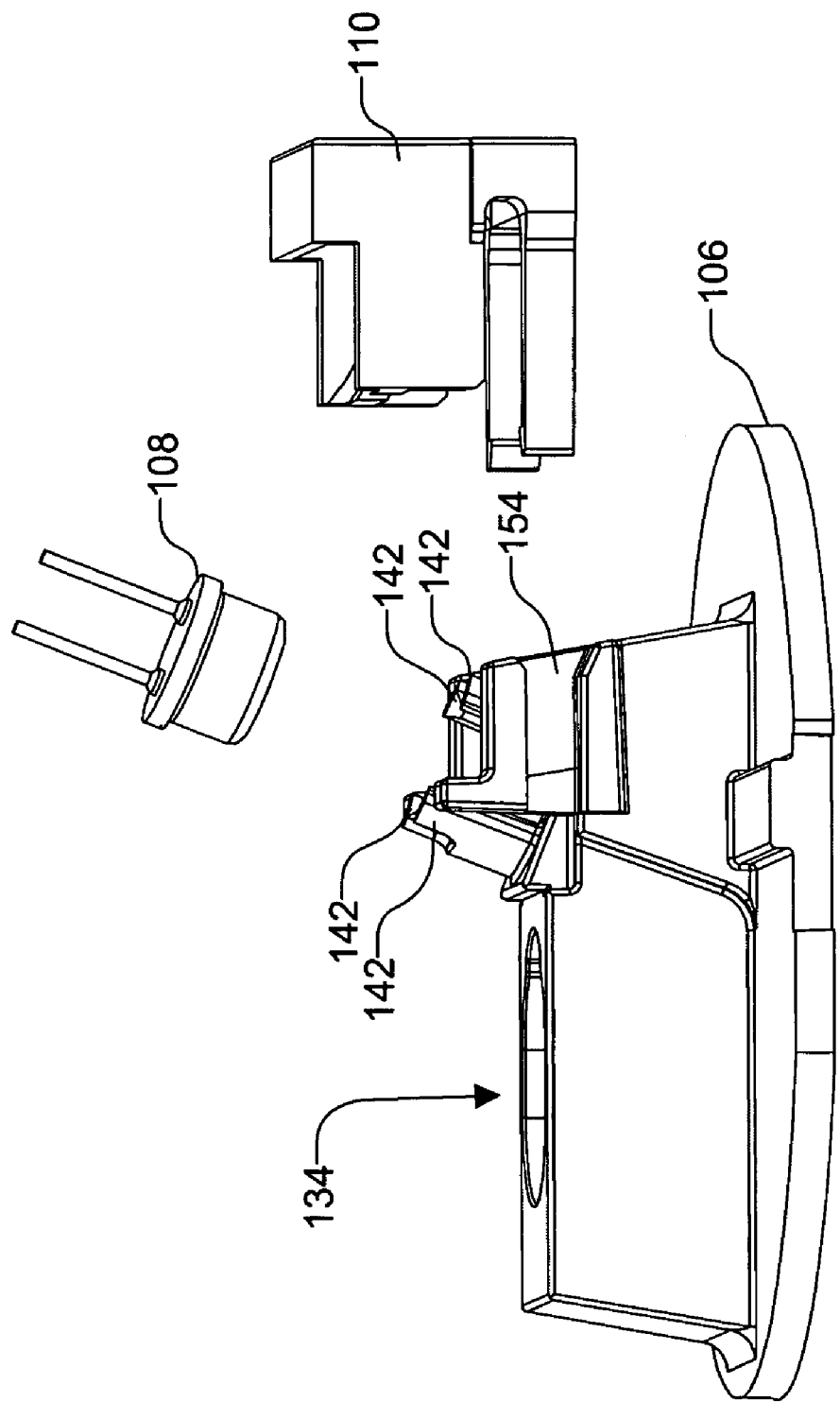
FIG. 8 illustrates an exploded view of a laser light source and an integral optics assembly in one embodiment of the invention.
Figure 9:
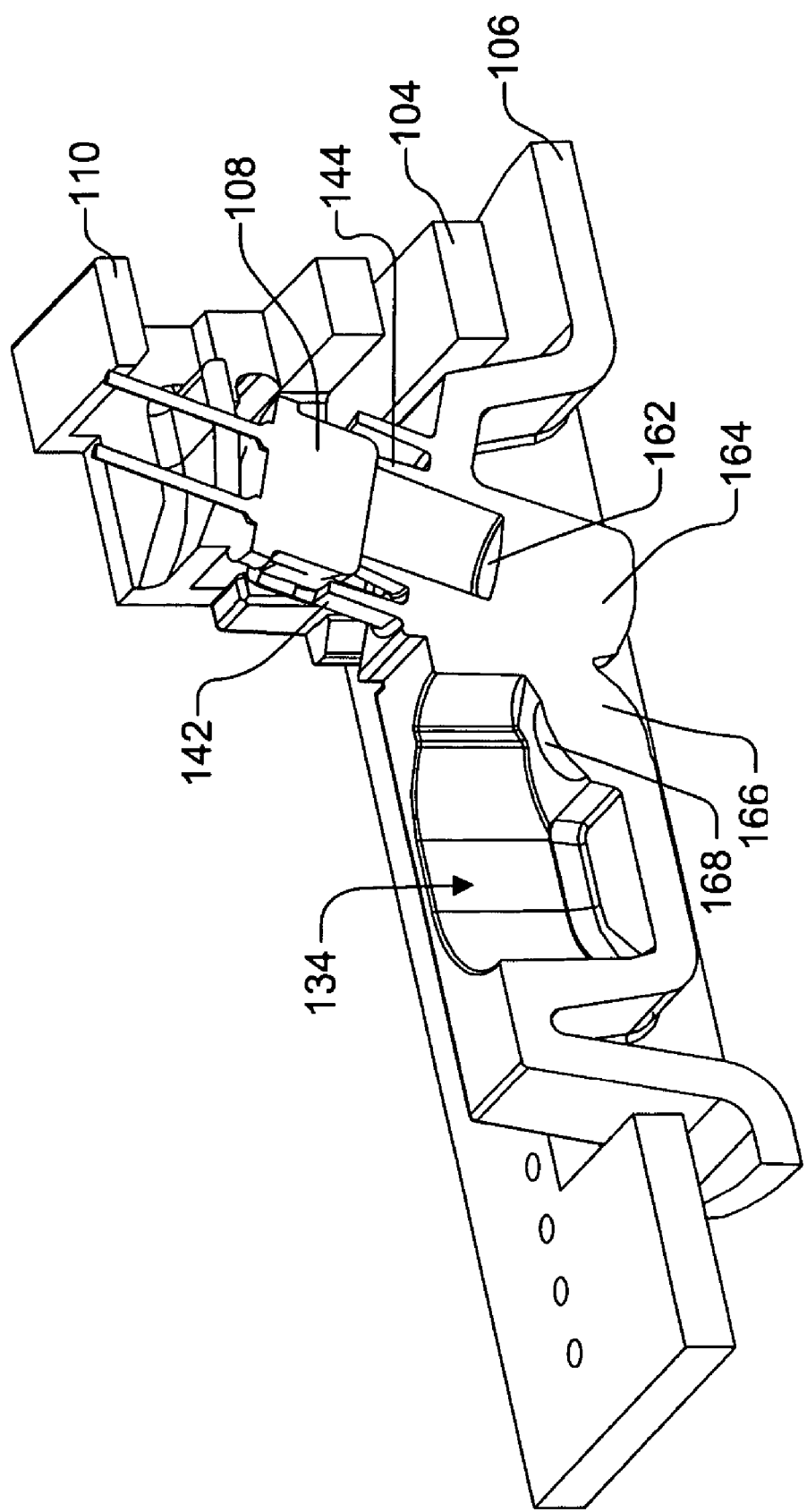
FIG. 9 illustrates an assembled cross-sectional view of the laser light source and the integral optics assembly in one embodiment of the invention.

Laser 108 may be a semiconductor laser sealed in a transistor-outline (TO) package. Laser 108 is inserted into light source alignment features 142 (shown more clearly in FIG. 8) integral with optics assembly 106 until it bottoms out against a light source alignment feature 144 (shown in FIG. 9) integral with optics assembly 106. In one embodiment, alignment features 142 are four trapezoidal guides that center laser 108 along an optical axis 146 (shown in FIG. 7), and alignment feature 144 is a ledge within guides 142 that controls the distance that laser 108 is placed along optical axis 146 away from navigation surface 129. Guides 142 are centered about optical axis 146 and dimensioned to provide a slight interference fit (e.g., press fit) with light source 108. The deflection of guides 142 is designed to be equal, thus positioning the light source 108 coaxial to optical axis 146.

After laser 108 is inserted, retention clip 110 is slid onto integral optics assembly 106 to lock in laser 108. Retention clip 110 has two cantilever latches 152 (only one is labeled) that engage shoulders 154 (only one is visible) formed on the opposite sides of optics assembly 106. Retention clip 110 further includes a curved contact surface 156 that fits flush against the bottom of the laser package to lock in laser 108.

Figure 7:
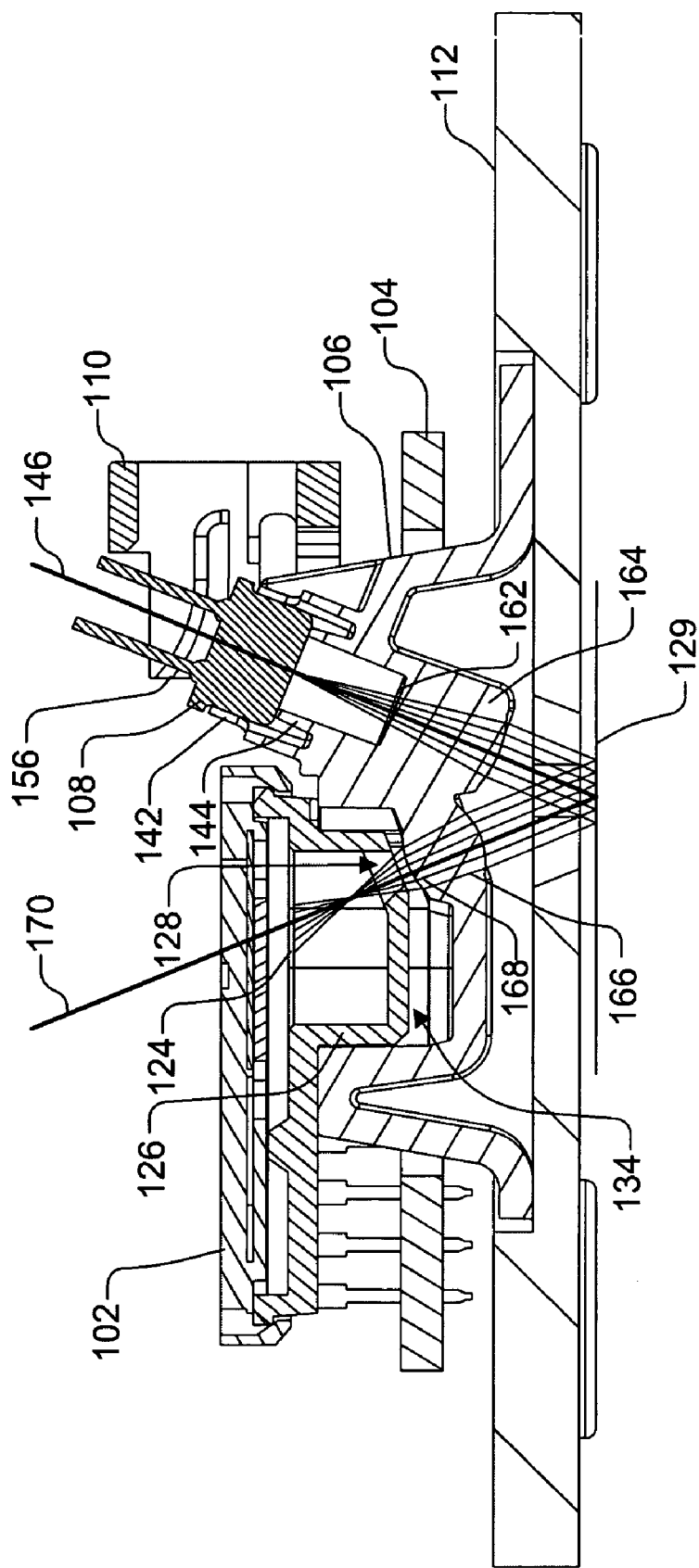
FIG. 7 illustrates a side cross-sectional view of the optical tracking assembly of FIG. 4 in one embodiment of the invention.

FIG. 7 is a cross-sectional view of integral optics assembly 106 in one embodiment of the invention. Optics assembly 106 is made of a material transparent to the laser light. Opposite of ledge 144, optics assembly 106 includes collimating lenses 162 and 164 that are centered about optical axis 146. As described above, optics assembly 106 defines alignment hole 134. Alignment hole 134 is formed with imaging lenses 166 and 168 that direct reflected light along an optical axis 170 to photocells 124 within optical sensor chip 102. Thus, optics assembly 106 is one integral piece manufactured with (1) the mechanical alignment features that center laser 108 along optical axis 146 and control the distance along optical axis 146 from navigation surface 129, and (2) the optics used to collimate the light onto navigation surface 129 and image the reflected light onto photocells 124. In one embodiment, optics assembly 106 is an injection-molded piece with great precision between the mechanical alignment features and the optics.

Referring back to FIG. 4, the assembled sensor chip 102, PCB 104, optics assembly 106, laser 108, and retention clip 110 are then mounted on mouse base late 112. Mouse base plate 112 includes an aperture 182 that allows light from collimating lenses 162 and 164 (FIG. 7) to exit the mouse, reflect off the navigation surface, and reenter the mouse onto imaging lenses 166 and 168 (FIG. 7).

As described above, laser light source 108 is precisely located by incorporating mechanical alignment features 142 and 144 within the same part as optical elements 162, 164, 166, and 168, specifically within the plane orthogonal to the optical axis 146 of illumination. By improving the alignment characteristics of the system, more uniform light, with improved distribution, is realized.

Some disadvantages of conventional designs include the number of parts that are utilized in the design and the inherent inaccuracies in the assembly. As described above, integral optics assembly 106 incorporates multiple features (mechanical and optical) into a single part that directly interfaces with laser light source 108, thereby reducing the number of parts and improving alignment accuracy between components.

Various other adaptations and combinations of features of the embodiments disclosed are within the scope of the invention. Numerous embodiments are encompassed by the following claims.

What is claimed is:

1. An optical tracking assembly for an optical mouse, comprising:
   a light source;
   an optical sensor chip; and
   an integral optics assembly, comprising:
      lenses; and
      light source alignment features receiving the light source, the light source alignment features centering the light source to the lenses and controlling a distance the light source is placed away from a navigation surface that reflects light onto the optical sensor chip, the light source alignment features including at least three guides for centering the light source, the light source alignment features further including a ledge within the guides for controlling the distance the light source is placed along a first optical axis away from the navigation surface.

2. The assembly of claim 1, wherein the lenses are selected from the group consisting of (1) collimating lenses for collimating light from the light source along the first optical axis to the navigation surface, and (2) imaging lenses for imaging reflected light from the navigation surface along a second optical axis to the optical sensor chip.

3. The assembly of claim 1, wherein the light source is a laser.

4. The assembly of claim 1, further comprising a retention clip engaged to the integral optics assembly to lock in the light source.

5. The assembly of claim 1, further comprising a printed circuit board (PCB) onto which the optical sensor chip is mounted.

6. The assembly of claim 5, wherein integral optics assembly further comprises a sensor alignment hole for receiving a sensor alignment feature on the optical sensor chip.

7. The assembly of claim 6, wherein the PCB defines a cutout that receives the integral optics assembly.

8. The assembly of claim 1, further comprising a mouse base plate, wherein the integral optics assembly is mounted on the mouse base plate.

9. The assembly of claim 1, wherein the ledge is positioned within the guides such that the ledge is in contact with the light source.

10. A method for assembling an optical tracking assembly for an optical mouse, comprising:
    mounting an optical sensor chip on a printed circuit board (PCB);
    inserting an integral optics assembly through a cutout defined by the PCB until the sides of the integral optics assembly are flush against the cutout; and
    inserting a light source in light source alignment features on the integral optics assembly, the light source alignment features centering the light source to lenses integral with the integral optics assembly, the light source alignment features further controlling a distance from the light source to a navigation surface, the light source alignment features including at least three guides for centering the light source, the light source alignment features further including a ledge within the guides for controlling the distance the light source is placed along a first optical axis away from the navigation surface.

11. The method of claim 10, wherein said inserting an integral optics assembly through a cutout defined by the PCB further comprises inserting a sensor alignment feature on the optical sensor chip into a sensor alignment hole defined by the integral optics assembly.

12. The method of claim 11, further comprising engaging a retention clip to the integral optics assembly to lock in the light source.

13. The method of claim 12, further comprising mounting the integral optics assembly on a mouse base plate.

14. The method of claim 10, wherein the ledge is positioned within the guides such that the ledge is in contact with the light source.

15. An optical tracking assembly for an optical mouse, comprising:
    a light source;
    a printed circuit board (PCB) defining a cutout;
    an optical sensor chip mounted on the PCB, the optical sensor chip comprising a protruding alignment feature;

an integral optics assembly inserted at least partially through the cutout, the integral optics assembly comprising:
  guides receiving the light source, the guides centering the light source along a first optical axis;
  a ledge within the guides abutting the light source, the ledge controlling a distance of the light source along the first optical axis away from a navigation surface;
  collimating lenses along the first optical axis for directing light from the light source onto the navigation surface;
  imaging lenses for directing the light along a second optical axis from the navigation surface to the optical sensor chip; and
  an alignment hole for receiving the protruding alignment feature on the optical sensor chip when the integral optics assembly is inserted at least partially through the cutout of the PCB; and
a retention clip engaged to the integral optics assembly to retain the light source.

* * * * *